(12) United States Patent
Nakamoto

(10) Patent No.: US 11,040,446 B2
(45) Date of Patent: Jun. 22, 2021

(54) TRANSPORTER, TRANSPORT SYSTEM, AND CONTROLLER

(71) Applicants: Kabushiki Kaisha Toshiba, Minato-ku (JP); Toshiba Infrastructure Systems & Solutions Corporation, Kawasaki (JP)

(72) Inventor: Hideichi Nakamoto, Setagaya (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 410 days.

(21) Appl. No.: 16/106,397

(22) Filed: Aug. 21, 2018

(65) Prior Publication Data

US 2019/0283251 A1 Sep. 19, 2019

(30) Foreign Application Priority Data

Mar. 14, 2018 (JP) .............................. JP2018-046924

(51) Int. Cl.
  *B25J 9/16* (2006.01)

(52) U.S. Cl.
  CPC ............. *B25J 9/1653* (2013.01); *B25J 9/163* (2013.01); *B25J 9/1607* (2013.01); *B25J 9/1638* (2013.01); *B25J 9/16* (2013.01)

(58) Field of Classification Search
  USPC ............................................... 700/245–264
  See application file for complete search history.

(56) References Cited

U.S. PATENT DOCUMENTS

| 4,132,318 | A | * | 1/1979 | Wang | ..................... B25J 13/082 294/86.4 |
| 5,265,195 | A | * | 11/1993 | Jinno | ...................... B24B 27/04 700/261 |
| 7,403,836 | B2 | * | 7/2008 | Aoyama | .............. H04N 13/239 700/259 |
| 8,639,644 | B1 | * | 1/2014 | Hickman | ............... G06N 3/008 706/14 |
| 8,688,264 | B2 | * | 4/2014 | Nignon | .................. B65G 47/90 700/223 |
| 9,205,558 | B1 | * | 12/2015 | Zevenbergen | ......... B25J 9/1633 |
| 9,296,103 | B2 | * | 3/2016 | Iwatake | .................. B25J 9/1633 |

(Continued)

FOREIGN PATENT DOCUMENTS

| JP | 2003-305678 | 10/2003 |
| JP | 2009-36557 | 2/2009 |

(Continued)

*Primary Examiner* — Jonathan L Sample
(74) *Attorney, Agent, or Firm* — Oblon, McClelland, Maier & Neustadt, L.L.P.

(57) ABSTRACT

According to one embodiment, a transporter includes a holder, a moving mechanism, a sensor, an operation controller, and a parameter estimator. The holder is configured to hold an object. The moving mechanism is configured to move the holder. The sensor is provided at the holder or the moving mechanism. The operation controller is configured to execute a test operation of moving the holder in a state in which the object is held by the holder. The parameter estimator is configured to estimate at least one parameter relating to the object based on a result of detection acquired by the sensor during the test operation.

15 Claims, 12 Drawing Sheets

(56) References Cited

U.S. PATENT DOCUMENTS

| | | | | |
|---|---|---|---|---|
| 9,333,649 B1* | 5/2016 | Bradski | | G06T 7/60 |
| 2004/0265110 A1* | 12/2004 | Schnoor | | B25J 9/1638 |
| | | | | 414/729 |
| 2005/0131645 A1* | 6/2005 | Panopoulos | | G05D 1/0244 |
| | | | | 701/472 |
| 2006/0111811 A1* | 5/2006 | Okamoto | | B25J 9/0003 |
| | | | | 700/214 |
| 2007/0124024 A1* | 5/2007 | Okamoto | | B25J 9/0003 |
| | | | | 700/245 |
| 2009/0105880 A1* | 4/2009 | Okazaki | | B25J 9/1633 |
| | | | | 700/258 |
| 2012/0072023 A1* | 3/2012 | Ota | | B25J 9/1671 |
| | | | | 700/259 |
| 2014/0188277 A1* | 7/2014 | Lee | | B25J 9/1674 |
| | | | | 700/258 |
| 2015/0360368 A1* | 12/2015 | Shin | | B25J 13/088 |
| | | | | 700/253 |
| 2016/0016311 A1* | 1/2016 | Konolige | | B25J 9/1612 |
| | | | | 700/245 |
| 2016/0207195 A1* | 7/2016 | Eto | | B25J 9/1612 |
| 2016/0354925 A1* | 12/2016 | Shimodaira | | B25J 9/1664 |
| 2017/0080566 A1* | 3/2017 | Stubbs | | B25J 9/163 |
| 2017/0182661 A1* | 6/2017 | Nakamoto | | B25J 9/0024 |
| 2017/0259433 A1* | 9/2017 | Takeuchi | | B25J 9/1633 |
| 2018/0021949 A1* | 1/2018 | Miura | | B25J 9/1633 |
| | | | | 700/250 |
| 2018/0104825 A1* | 4/2018 | Vulcano | | B25J 11/00 |
| 2018/0169854 A1* | 6/2018 | Shiratsuchi | | B25J 9/042 |
| 2018/0215545 A1* | 8/2018 | High | | G06Q 10/087 |
| 2019/0228371 A1* | 7/2019 | Murphy | | B25J 9/1697 |

FOREIGN PATENT DOCUMENTS

| | | |
|---|---|---|
| JP | 2014-210311 | 11/2014 |
| JP | 2016-196077 | 11/2016 |
| JP | 2017-520417 | 7/2017 |

* cited by examiner

TRANSPORTER, TRANSPORT SYSTEM, AND CONTROLLER

CROSS-REFERENCE TO RELATED APPLICATION

This application is based upon and claims the benefit of priority from Japanese Patent Application No. 2018-046924 filed on Mar. 14, 2018, the entire contents of which are incorporated herein by reference.

FIELD

Embodiments described herein relate generally to a transporter, a transport system, and a controller.

BACKGROUND

Transporters for holding and moving an object are known.
A transporter is expected to move an object more efficiently.

DETAILED DESCRIPTION OF THE INVENTION

Figure 1:
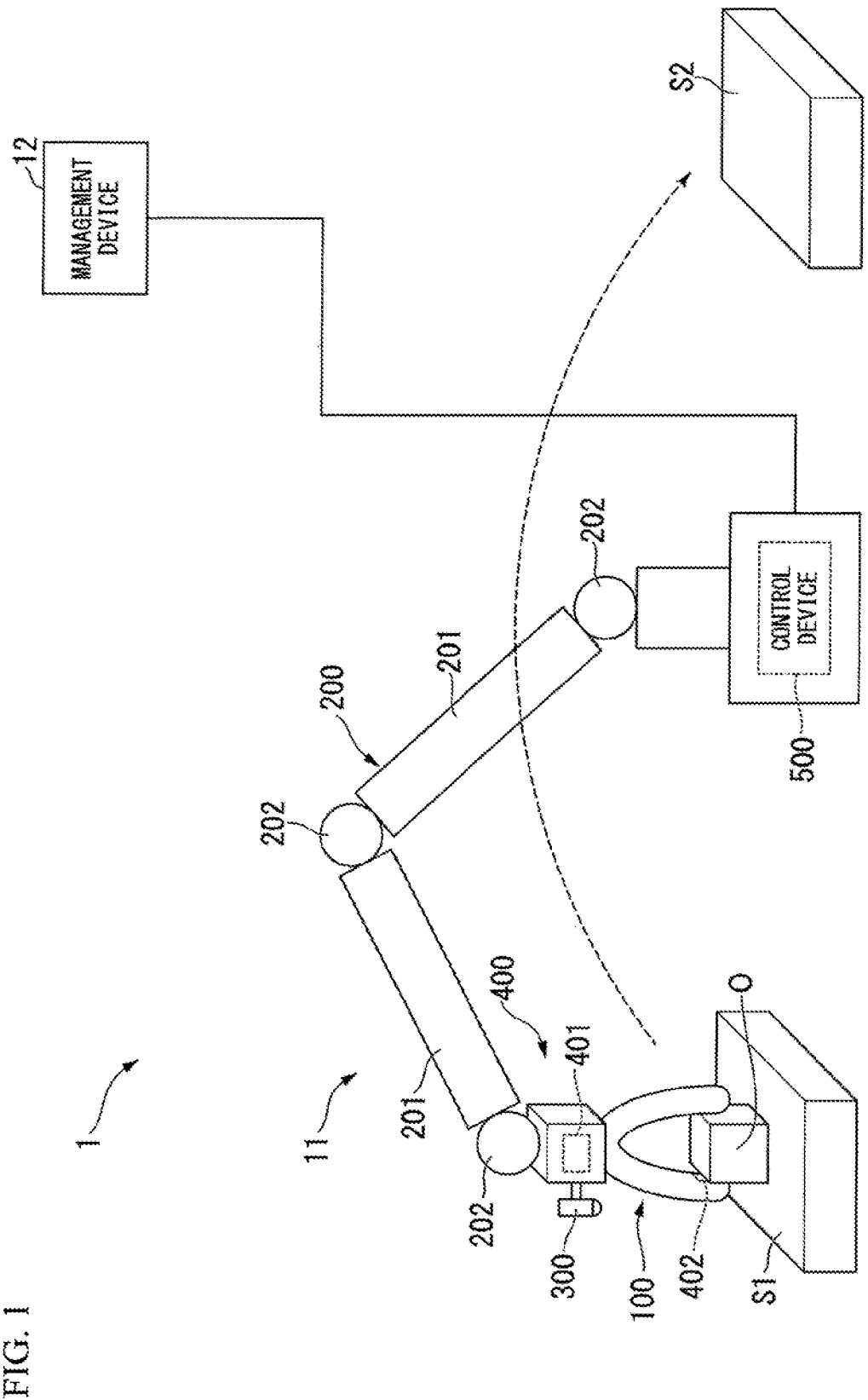
FIG. 1 is a diagram schematically showing a transport system according to a first embodiment.

According to one embodiment, a transporter includes a holder, a moving mechanism, a sensor, an operation controller, and a parameter estimator. The holder is configured to hold an object. The moving mechanism is configured to move the holder. The sensor is provided at the holder or the moving mechanism. The operation controller is configured to execute a test operation of moving the holder in a state in which the object is held by the holder. The parameter estimator is configured to estimate at least one parameter relating to the object based on a result of detection acquired by the sensor during the test operation.

Hereinafter, a transporter, a transport system, a controller, and a transport method according to embodiments will be described with reference to the drawings. In the description presented below, the same reference numerals will be attached to components having the same or similar functions. Duplicate description of these components may be omitted. In the specification, the term "based on XX" represents "based at least on XX" and includes the case of being based on any other element in addition to XX. In addition, the term "based on XX" is not limited to "based directly on XX", but also represents "based on something that is acquired by an arithmetic operation or other process being performed on XX". Here, "XX" is an arbitrary element (for example, arbitrary information).

First Embodiment

A first embodiment will be described with reference to FIGS. 1 to 11. FIG. is a diagram schematically showing a transport system 1 according to the first embodiment. In this embodiment, the transport system 1, for example, is a handling system used for distribution. The transport system 1 moves an object (transport target object) O positioned at a movement source S1 to a movement destination S2. Each of the movement source S1 and the movement destination S2, for example, is a box pallet, a carriage, tote, a foldable container, various conveyers, a sorter, or the like but there is no limitation thereto. In addition, the transport system 1 is not limited to a handling system for distribution and can be broadly applied to an industrial robot system used in a factory, other systems, and the like. "Transporter." "transport system," and "transport method" described here are not limited to an apparatus, a system, and a method mainly used for conveying an object and also include an apparatus, a system, and a method accompanying conveyance (movement) of an object for product assembly or a part of another object.

First, the entire configuration of the transport system 1 will be described.

As illustrated in FIG. 1, the transport system 1, for example, includes a transporter 11 and a management device 12.

The transporter 11, for example, is a robot device and holds an object O positioned at the movement source S1 and moves the held object O to the movement destination S2.

The transporter 11 can communicate with the management device 12 using wires or wirelessly. Details of the transporter 11 will be described later.

The management device (for example, host control apparatus) 12 manages and controls the entire transport system 1. For example, the management device 12 includes an input receiver that receives an operator's direction for the transporter 11 and an information outputter that displays an operation state of the transporter 11 for an operator. The management device 12 controls the transporter 11 based on a direction input to the input receiver. In addition, the management device 12 may be a device only performing information processing such as a server device without including the input receiver and the information outputter.

Next, one example of the transporter 11 will be described. As illustrated in FIG. 1, the transporter 11, for example, includes a holder 100, a moving mechanism 200, an object detecting camera 300, a measurer 400, and a control device 500.

The holder 100 is a holding device that holds an object O positioned at the movement source S1. For example, the holder 100 includes a suction device such as a vacuum pump and a sucker (for example, a suction pad) communicating with the suction device and holds an object O by suction. Here, the holder 100 may be a holder holding an object O by pinching the object O using a plurality of pinching members or a holder holding an object O using any other mechanism. In several diagrams including FIG. 1, the holder 100 is schematically illustrated.

The moving mechanism 200 is a mechanism that moves the holder 100 to a desired position. For example, the moving mechanism 200 may be a robot arm of six axes and including a plurality of arm members 201, a plurality of rotators 202 connecting the plurality of arm members 201 such that they become rotatable, and actuators (for example, motors), which are not illustrated in the drawing, driving the rotators 202. Here, the moving mechanism 200 may be an orthogonal robot arm of three axes or a mechanism that moves the holder 100 to a desired position by employing any other configuration. For example, the moving mechanism 200 may be a flying body (for example, drone) that lifts and moves the holder 100 using rotor blades.

The object detecting camera 300 images an object O (a holding target) positioned at the movement source S1. For example, the object detecting camera 300 is provided at the holder 100 or the moving mechanism 200. Here, the object detecting camera 300 may be fixed to a position on the lateral side of the movement source S1 or above the movement source S1, or the like and image an object O positioned at the movement source S1.

Here, in this embodiment, there are cases in which a plurality of types of object O having different sizes or shapes are randomly placed at the movement source S1. The object detecting camera 300 is one example of a detector that acquires information used for determining a type of an object O to be held. The object detecting camera 300, for example, may acquire image data of an outer shape of an object O or acquire image data of a feature portion of an object O. The "feature portion of an object" may be a portion of an object O that includes a unique shape according to the type of object O, a tag (text information, a barcode, or the like used for identifying an object) attached to an object O, or the like. The object detecting camera 300 outputs captured image data to the control device 500.

The measurer 400 includes one or more sensors and measures one or more physical quantities acting on an object O. In this embodiment, the measurer 400 includes a force sensor 401 and a holding force detecting sensor 402.

The force sensor 401 is provided at the holder 100 or the moving mechanism 200. The force sensor 401 is one example of a "sensor." By measuring a force and moment acting on the holder 100 holding the object O, the force sensor 401 measures the weight of the object O held by the holder 100 and measures a force and moment acting on the object O in a test operation to be described later. For example, the force sensor 401 may be a force sensor of six axes and measures accelerations of three axes in an orthogonal coordinate system and three moments around the three axes. The force sensor 401 outputs the measured information to the control device 500.

The holding force detecting sensor 402, for example, is provided at the holder 100 and measures a value relating to a holding force of the holder 100 for the object O. The holding force detecting sensor 402 is one example of a "detector." For example, in a case where the holder 100 including a sucker is used, the holding force detecting sensor 402 is a pressures sensor capable of detecting a pressure value inside the sucker. The pressure sensor measures a pressure value inside the sucker as a value relating to a holding force of the holder 100 for the object O. On the other hand, in a case where the holder 100 including a pinching member is used, the holding force detecting sensor 402 is a pressure sensitive sensor (for example, a piezo-device) provided at the pinching member. The pressure sensitive sensor measures a contact pressure between the pinching member and the object O as a value relating to the holding force of the holder 100 for the object O. The holding force detecting sensor 402 outputs the measured information to the control device 500.

Figure 2:
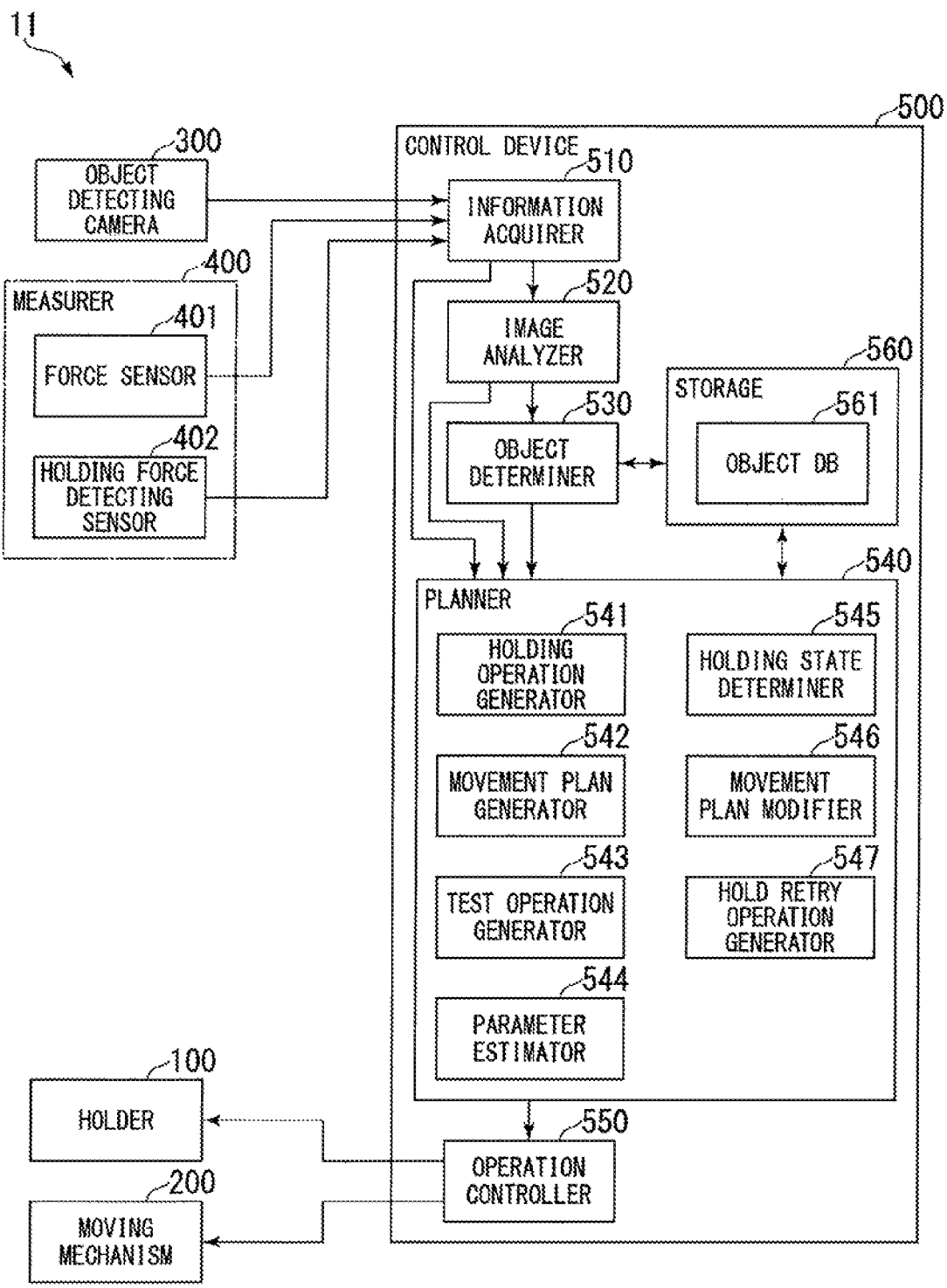
FIG. 2 is a block diagram showing a system configuration of a transporter according to the first embodiment.

The control device 500 controls the overall operation of the transporter 11. The control device 500 is one example of a "controller." FIG. 2 is a block diagram showing a system configuration of the transporter 11. The control device 500 includes, for example, an information acquirer 510, an image analyzer 520, an object determiner 530, a planner 540, an operation controller 550, and a storage 560.

A part or the whole of each functional unit (for example, the information acquirer 510, the image analyzer 520, the object determiner 530, the planner 540, and the operation controller 550) of the control device 500, for example, is realized by one or more processors such as a central processing unit (CPU) or a graphics processing unit (GPU) executing a program stored in a program memory. However, a part or the whole of the functional unit may be realized by hardware (for example, circuitry) such as a large scale integration (LSI), an application specific integrated circuit (ASIC), a field-programmable gate array (FPGA), or a programmable logic device (PLD). In addition, the storage 560 is realized by a flash memory, an electrically erasable programmable read-only memory (EEPROM), a read-only memory (ROM), a random access memory (RAM), or the like.

Here, for the convenience of description, the storage 560 will be described first. The storage 560 stores an object database 561 (hereinafter, referred to as an "object DB 561"). In the object DB 561, for example, types of one or more objects O, feature information of the objects O, and various parameters relating to the objects O are registered in association with each other. An object O registered in the object DB may be an object O that was transported by the transporter 11 in the past or an object O that is registered in advance by the management device 12. The "feature information" is information that can be used for specifying the object O (identifying the object from other objects) and is an external shape (a size or a shape) or a color of the object O or information represented in a tag attached to the object O. The "parameters relating to an object" are values representing the physical properties of the object O and are a weight of the object O, a three-dimensional position of the center of gravity of the object O, and a friction coefficient of the surface of the object O, and the like.

The information acquirer 510 acquires image data captured by the object detecting camera 30 from the object detecting camera 300. In addition, the information acquirer 510 acquires information measured by the measurer 400 from the measurer 400. "Acquisition" described here is not limited to a case in which information is acquired by transmitting a transmission request signal and includes a case in which information is acquired by passively receiving the information. The information acquirer 510 outputs the image data acquired from the object detecting camera 300 to the image analyzer 520. In addition, the information acquirer 510 outputs the information acquired from the measurer 400 to the planner 540.

The image analyzer 520 performs a predetermined image analysis for the image data acquired by the object detecting camera 300 and recognizes position information, external shape information, and feature information of the object O. The image analyzer 520 outputs the position information and the external shape information of the object O acquired through the image analysis to the planner 540. In addition, the image analyzer 520 outputs the feature information of the object O acquired through the image analysis to the object determiner 530.

The object determiner 530 compares the feature information acquired by the image analyzer 520 with feature information registered in the object DB 561 of the storage 560. Accordingly, the object determiner 530 determines whether the object O to be held is a known object or an unknown object for the transporter 11. A "known object" represents an object for which parameters relating to the object O are registered in the object DB 561. On the other hand, an "unknown object" represents an object for which parameters relating to the object O are not registered in the object DB 561.

For example, in a case where a difference between the feature information acquired by the image analyzer 520 and the feature information registered in the object DB 561 is less than a threshold, the object determiner 530 determines that the object O to be held is a known object. On the other hand, in a case where the difference between the feature information acquired by the image analyzer 520 and the feature information registered in the object DB 561 is the threshold or more, the object determiner 530 determines that the object O to be held is an unknown object. The object determiner 530 outputs a result of the determination by the object determiner 530 to the planner 540.

The planner 540 generates a movement plan for moving the object O from the movement source S1 to the movement destination S2. In this embodiment, by performing a test operation, the planner 540 generates a movement plan for moving the object O more efficiently and more assuredly. The planner 540, for example, includes a holding operation generator 541, a movement plan generator 542, a test operation generator 543, a parameter estimator 544, a holding state determiner 545, a movement plan modifier 546, and a hold retry operation generator 547.

First, the holding operation generator 541 will be described. The holding operation generator 541 generates a holding operation plan for holding the object O based on the position and the features (the size, the shape, and the like) of the object O. For example, the holding operation plan includes a holding position on the surface of the object O held by the holder 100, a holding posture of the holder 100 with respect to the object O, and the like. The holding operation generator 541 outputs the generated holding operation plan to the operation controller 550.

Next, the movement plan generator 542 will be described. The movement plan generator 542 generates a movement plan for moving the object O held at the movement source S1 to the movement destination S2 based on the features (the size, the shape, and the like) of the object O, obstacles between the movement source S and the movement destination S2, other restriction conditions, and the like. The movement plan, for example, includes a movement path (track) of the holder 100, a speed of the holder 100, an acceleration of the holder 100, and the like for moving the object O. In this embodiment, the movement plan generator 542 generates a movement plan for the transporter 11 to move the object O from the movement source S1 to the movement destination S2 in a possible shortest time. In other words, the movement plan generator 542 generates a movement plan that satisfies a predetermined condition for efficiently moving the object O.

Next, the test operation generator 543 will be described. In a case where an object O to be held is an unknown object, the test operation generator 543 generates an operation plan for performing a test operation for estimating the parameters of the object O. The test operation is performed by moving the holder 100 in a state in which the object O is held by the holder 100. Here, "moving the holder 100" represents changing at least one of the position and the posture of the holder 100 and, for example, is realized by controlling the moving mechanism 200. This test operation is performed before a transport operation of moving the object O toward the movement destination S2. For example, a test operation is arbitrarily selected from among several test operations represented below or may be performed by combining the test operations.

First Example of Test Operation

Figure 3:
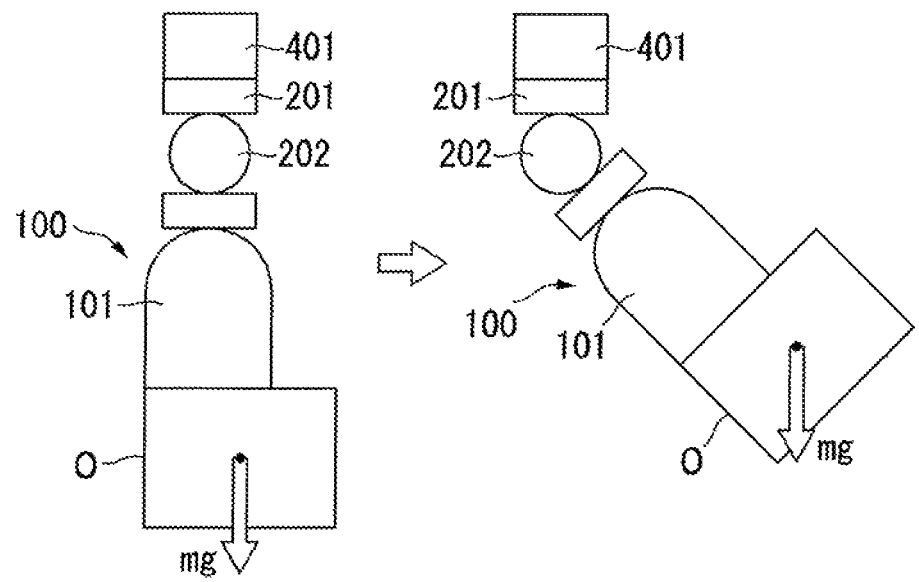
FIG. 3 is a front view showing a first example of a test operation of the transporter according to the first embodiment.

First, a first example of a test operation will be described. FIG. 3 is a front view showing the first example of the test operation performed by the transporter 11. Here, in a case where the holder 100 is directed toward the vertical direction, while a position of the center of gravity of the object O in a position in the horizontal direction can be calculated based on a result of the measurement acquired by the force sensor 401 of six axes, a position in the vertical direction cannot be acquired. Thus, the test operation of this first example includes an operation of inclining the holder 100 holding the object O by rotating the rotator 202 of the moving mechanism 200 by the operation controller 550. Accordingly the position of the center of gravity of the object O with respect to the holder 100 changes in the horizontal direction and the vertical direction, and a force and a moment measured by the force sensor 401 change. In other words, by comparing forces and moments measured by the force sensor 401 in a state before the inclination of the object O and in a state in which the object O is inclined, a three-dimensional position (a position in the horizontal direction and a position in the vertical direction) of the center of gravity of the object O can be calculated. For example, this test operation includes temporarily stopping the holder 100 and the object O in a state in which the holder 100 holding the object O is inclined. For example, the force sensor 401 measures a force and a moment acting on the holder 100 holding the object O in a state in which the object O is stopped before the holder 100 is inclined (or after returning to the original state from the inclined state), and measures a force and a moment acting on the holder 100 holding the object O in a state in which the holder 100 is inclined and the object O is stopped. For example, the test operation of this first example is performed at a position at which the holder 100 has lifted the object O from the movement source S1 without moving the holder 100 toward the movement destination S2.

In the test operation of this first example, static measurement can be performed using the force sensor 401 in a state in which the object O is stopped, and accordingly, there are cases in which parameters relating to the objects O can be estimated with higher accuracy than that in a test operation of a second example to be described later. For this reason, for example, in a case where the features of the object O satisfy a predetermined condition (for example, a case in which there is sufficient space for inclining the object O) in a case where the test operation generator 543 generates a test operation, the test operation of the first example may be executed with a higher priority with respect to the test operation of the second example.

Second Example of Test Operation

Figure 4:
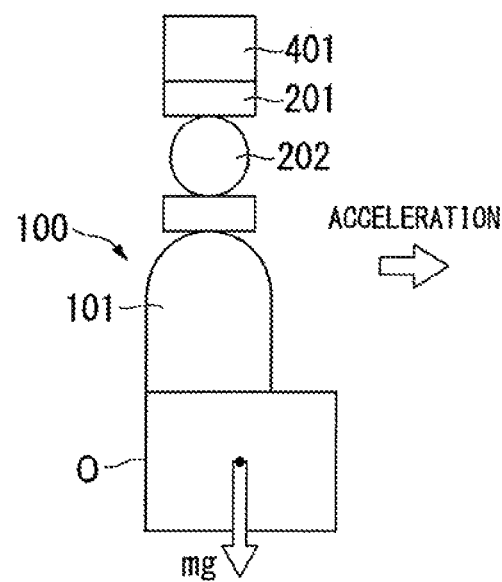
FIG. 4 is a front view showing a second example of the test operation of the transporter according to the first embodiment.

Next, the second example of the test operation will be described. FIG. 4 is a front view showing the second example of the test operation performed by the transporter 11. In this second example, the test operation includes an operation of applying an acceleration (translational acceleration) to the holder 100 holding an object O without inclining the holder 100. Accordingly, a force and a moment measured by the force sensor 401 change. In other words, by measuring an inertial force and an inertial moment acting on the object O in a case where a translational acceleration is applied to the holder 100, a three-dimensional position of the center of gravity of the object O can be calculated. For example, the test operation of this second example may be performed by moving the object O in a direction different from a direction toward the movement destination S2.

In the test operation of this second example, a space for inclining the object O is not necessary. For this reason, for example, in a case where there is not sufficient space for inclining an object O, the test operation generator 543 may execute the test operation of the second example with a higher priority with respect to the test operation of the first example. In addition, in this second example, measurement can be performed while moving the object O, and accordingly, there is a possibility that a transition to a next operation may be able to be made directly. For this reason, in a case where shortening of an operation time needs to be prioritized over accuracy of the estimation of parameters relating to the object O, the test operation of the second example may be executed with a higher priority with respect to the test operation of the first example.

Third Example of Test Operation

Figure 5A:
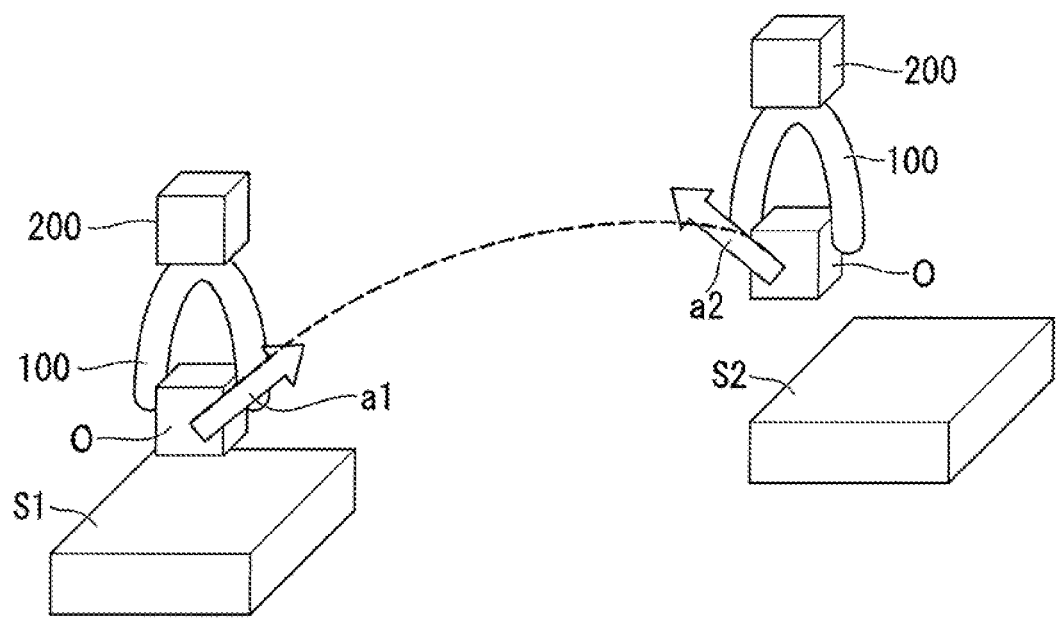
FIG. 5A is a perspective view showing one example of a movement plan of an object which is used by the transporter according to the first embodiment.

Next, a third example of the test operation will be described. Here, FIG. 5A is a perspective view showing one example of a movement plan generated by the movement plan generator 542. In this movement plan, a first acceleration a1 that is a maximum acceleration in a first direction is assumed to act on the object O at a first time point (for example, an initial stage of movement), and a second acceleration a2 that is a maximum acceleration in a second direction is assumed to act thereon at a second time point (for example, a final stage of movement). For example, the first acceleration a1 is an acceleration for accelerating the object O toward the movement destination S2. For example, the second acceleration a2 is an acceleration for stopping (in other words, decelerating) the object O at the movement destination S2.

Figure 5B:
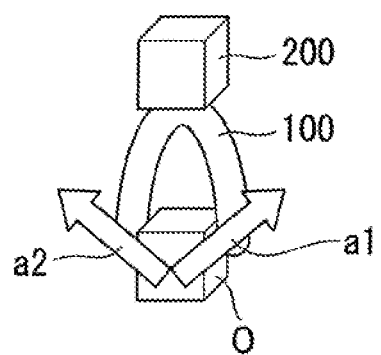
FIG. 5B is a perspective view showing a third example of the test operation of the transporter according to the first embodiment.

FIG. 5B is a perspective view showing a third example of a test operation performed by the transporter 11. The test operation of this third example is performed by applying one or more maximum accelerations assumed in a movement plan generated by the movement plan generator 542 to the object O. For example, in the test operation corresponding to the movement plan illustrated in FIG. 5A, an operation of applying a first acceleration a1 to the object O in the first direction and applying a second acceleration a2 to the object O in the second direction is included. This test operation, for example, is performed at a position to which the object O is lifted from the movement source S1 without moving the object O as in the movement plan.

Next, applied examples of the first example to the third example of the test operation will be described. For example, the test operation generator 543 may change a content of the test operation based on a weight of an object O measured by the force sensor 401. For example, in a case where a weight of the object O is more than a first weight threshold, the test operation generator 543 performs the test operation at a lower acceleration than that in a case where the weight of the object O is the first weight threshold or less. Accordingly, the test operation can be performed in a state in which it is more difficult for the object O to be dropped. On the other hand, in a case where a weight of the object O is a second weight threshold or less, the test operation generator 543 performs the test operation at a higher acceleration than that in a case where the weight of the object O is the second weight threshold or more. Accordingly, a time required for the test operation can be shortened. Here, the first weight threshold and the second weight threshold may have the same value.

Next, the parameter estimator 544 will be described. The parameter estimator 544 estimates parameters relating to the object O based on one or more physical quantity acting on the object O in accordance with the test operation described above (in other words, one or more physical quantities acting on the holder 100 in accordance with the test operation). In this embodiment, in a case where an object O to be held is determined as being a known object by the object determiner 530 (in other words, a case in which an object O of which parameters are registered in the object DB 561 is determined, and the test operation is not performed), the parameter estimator 544 does not estimate the parameters relating to the object O. On the other hand, in a case where an object O to be held is determined as being an unknown object by the object determiner 530 (in other words, in a case where an object O of which parameters are not registered in the object DB 561 is determined, and the test operation is performed), the parameter estimator 544 estimates the parameters relating to the object O.

Hereinafter, the estimation of parameters by the parameter estimator 544 will be described. These parameters are estimated, for example, based on a force and a moment that act on the holder 100 and are measured by the force sensor 401. In this embodiment, as the parameters relating to an object O, the parameter estimator 544 estimates a weight of the object O and a three-dimensional position of the center of gravity of the object O.

For example, the parameter estimator 544 estimates the weight of the object O based on a force acting on the holder 100 in a state in which the object O is held and lifted by the holder 100.

In addition, in a case where the test operation of the first example is performed, the parameter estimator 544 estimates a three-dimensional position of the center of gravity of the object O based on relational equations among the posture of the holder 100 that is, before the test operation (before inclining the object O) and a force and a moment acting on the holder 100 in that posture, and the posture of the holder 100 during the test operation (that is, a state in which the object O is inclined), and between a force and a moment acting on the holder 100 in that posture. Here, the posture of the holder 100, for example, can be acquired based on a detection value output from a detector (an encoder or the like) provided at the moving mechanism 200 or a control target value output from the operation controller 550 or the like.

In addition, in a case where the test operation of the second example or the third example described above is performed, the parameter estimator 544 estimates a three-dimensional position of the center of gravity of the object O based on an inertial force and an inertial moment acting on the holder 100 during the test operation.

Next, the holding state determiner 545 will be described. The holding state determiner 545 determines a holding state of the object O using the holder 100 (that is, a holding state of the holder 100 for the object O) based on a value relating to a holding force detected by the holding force detecting sensor 402 and parameters (for example, a weight and a three-dimensional position of the center of gravity) relating to the object O. In this embodiment, the holding state determiner 545 determines a holding state of the object O using the holder 100 based on a movement plan of the object O for movement toward the movement destination S2 of the object O (for example, a movement plan generated by the movement plan generator 542) in addition to the value relating to the holding force detected by the holding force detecting sensor 402 and the parameters relating to the object O.

Here, in a case where the object O is a known object, the holding state determiner 545 determines a holding state of the object O using the parameters relating to the object O registered in the object DB 561. On the other hand, in a case where the object O is an unknown object, the holding state determiner 545 determines a holding state of the object O using the parameters relating to the object O estimated by the parameter estimator 544.

Figure 6:
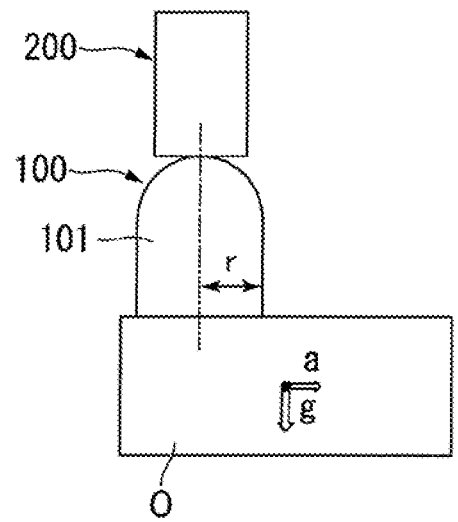
FIG. 6 is a front view showing one example of score calculation executed by a holding state determiner according to the first embodiment.

In this embodiment, the holding state determiner 545 calculates the holding state of the object O using the holder 100 as a score. FIG. 6 is a front view showing one example of score calculation using the holding state determiner 545. FIG. 6 shows a case in which an object O is held by a sucker 101 of the holder 100. Here, in a case where a mass of the object O is denoted by m, an assumed acceleration acting on the object O is denoted by "a" (three-dimensional vector), a gravitational acceleration acting on the object O is denoted by g (three-dimensional vector), a resultant force based on the assumed acceleration a and the gravitational acceleration g (a translational force applied to the sucker 101) is denoted by F (three-dimensional vector), a cross-sectional area of a cross-section of the sucker 101 taken along a direction that is substantially orthogonal to a direction in which the sucker 101 and the object O overlap with each other (hereinafter, referred to as a "specific cross-section") is denoted by A, a radius of the sucker 101 on the specific cross-section is denoted by r, a difference between the atmospheric pressure and the pressure of the inside of the sucker 101 is denoted by ΔP, a position vector of a three-dimensional position of the center of gravity of the object O is denoted by c (three-dimensional vector), a moment applied to the sucker 101 is denoted by T (scalar), a coefficient relating to the posture of the holder 100 (sucker 101) with respect to the direction of the resultant force F is denoted by α, and a coefficient relating to the moment is denoted by $\beta_1$, the holding state determiner 545 calculates a score S representing a holding state of the object O based on the following Equation (1).

$$S = \frac{A\Delta P}{\alpha(F + \beta_1(T/r))} \qquad (1)$$
$$F = m(a+g)$$
$$T = |c \times F|$$

Here, the mass m of the object is calculated based on a result of measurement using the force sensor 401. The assumed acceleration "a" acting on the object O is a maximum acceleration assumed to applied to the object O in the movement plan of the object O for movement toward the movement destination S2 and, for example, can be acquired from the movement plan generated by the movement plan generator 542. The pressure difference ΔP, for example, is calculated based on a pressure value of the inside of the sucker 101 that is measured by the holding force detecting sensor 402 that is a pressure sensor. The position vector c of the three-dimensional position of the center of gravity of the object O is a position vector representing a three-dimensional position of the center of gravity of the object O using the center of the sucker 101 on the specific cross-section as a base point and uses a three-dimensional position of the center of gravity estimated by the parameter estimator 544 in a case where the object O is unknown and uses a three-dimensional position of the center of gravity registered in the object DB 561 in a case where the object O is known.

The coefficient α relating to the posture of the holder 100 with respect to the direction of the resultant force F is a coefficient that changes in accordance with a relation between a direction in which the resultant force F based on the assumed acceleration "a" and the gravitational acceleration g acts and the posture of the holder 100. For example, the coefficient α is a minimum in a case where a direction in which the sucker 101 and the object O are aligned and a direction in which the resultant force F acts coincide with each other, increases as an angle between the direction in which the sucker 101 and the object O are aligned and the direction in which the resultant force F acts increases, and is a maximum in a case where the direction in which the sucker 101 and the object O are aligned and the direction in which the resultant force F acts are substantially orthogonal to each other. This coefficient α is set in accordance with the features (a shape, a material, and the like) of the holder 100.

The coefficient $\beta_1$ relating to a moment is a value in which the degree of easiness, in which the holding force of the sucker 101 is damaged in accordance with the moment, is reflected and is set in accordance with the material, the shape, and the like of the sucker 101. The coefficient $\beta_1$ relating to a moment has a smaller value in a case where the holding force of the sucker 101 is more easily maintained in a case where the moment acts.

Figure 7:
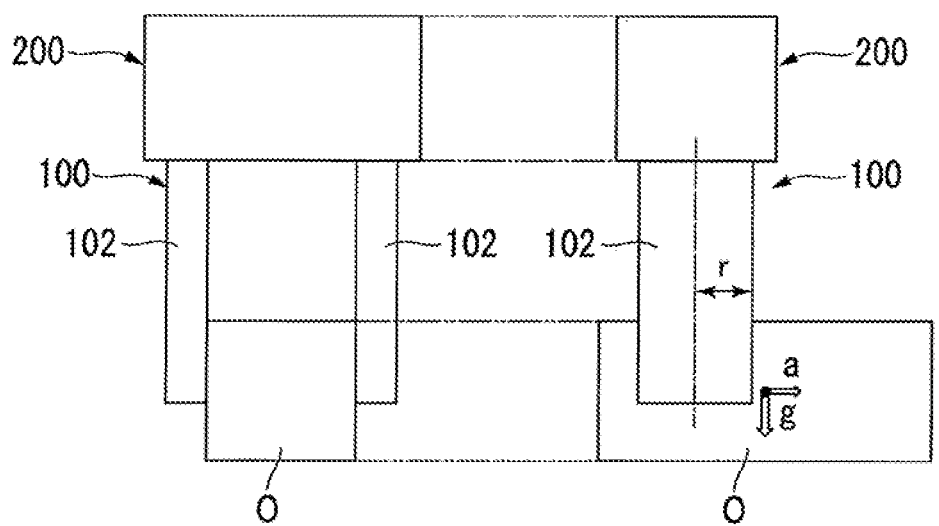
FIG. 7 is a diagram showing another example of score calculation executed by a holding state determiner according to the first embodiment.

FIG. 7 is a diagram showing another example of score calculation executed by the holding state determiner 545. FIG. 7 shows a case in which an object O is pinched and held by one pair of pinching members 102 of the holder 100. Here, in a case where a mass of the object O is denoted by m, an assumed acceleration acting on the object O is denoted by "a" (three-dimensional vector), a gravitational acceleration acting on the object O is denoted by g (three-dimensional vector), a resultant force based on the assumed acceleration "a" and the gravitational acceleration g (a translational force applied to the pinching members 102) is denoted by F (three-dimensional vector), a gripping force acting on the object O from one of the pinching members 102 is denoted by H, a half of the width of the pinching members 102 in a direction that is substantially orthogonal to a direction in which the object O is interposed between the one pair of the pinching members 102 is denoted by r, a position vector of a three-dimensional position of the center of gravity of the object O is denoted by c (three-dimensional vector), a moment applied to the pinching members 102 is denoted by T (scalar), a coefficient relating to the posture of the holder 100 (the pinching members 102) with respect to the direction of the resultant force F is denoted by α, and a coefficient relating to friction is denoted by $\beta_2$, the holding state determiner 545 calculates a score S representing a holding state of the object O based on the following Equation (2).

$$S = \frac{\beta_2 H}{\alpha(F + (T/r))} \quad (2)$$

$$F = m(a + g)$$

$$T = |c \times F|$$

Here, meanings and calculation methods of the mass m of the object, the assumed acceleration "a" acting on the object O. and the position vector c of the three-dimensional position of the center of gravity of the object O are almost the same as those of a case illustrated in FIG. 6. The gripping force H is calculated based on a contact pressure between the pinching member 102 and the object O measured by the holding force detecting sensor 402 that is a pressure sensitive sensor and a contact area between the pinching member 102 and the object O. The coefficient α relating to the posture of the holder 100 with respect to the direction of the resultant force F is a coefficient that changes in accordance with a relation between a direction in which the resultant force F based on the assumed acceleration "a" and the gravitational acceleration g acts and the posture of the pinching members 102. The coefficient $\beta_2$ relating to friction is a coefficient that is set using a frictional coefficient of the surface of the pinching member 102. For example, the coefficient $\beta_2$ has a larger value in a case where the frictional coefficient of the surface of the pinching member 102 is larger.

The holding state determiner 545 determines a holding state of the object O based on the score S calculated using the model illustrated in FIG. 6 or FIG. 7. For example, in a case where the score S is a first threshold K1 or more (one example of a case in which a first condition is satisfied), the holding state determiner 545 determines that there is no problem in moving the object O using the holder 100 based on the movement plan (a movement plan of the initial period; a movement plan without any modification) generated by the movement plan generator 542. On the other hand, in a case where the score S is less than the first threshold K1 and is a second threshold K2 or more (one example of a case in which a second condition is satisfied), the holding state determiner 545 determines that there is no problem in moving the object O using the holder 100 in a case where the movement plan is modified. In a case where the score S is less than the second threshold K2 (one example of a case in which a third condition is satisfied), the holding state determiner 545 determines that it is necessary to release the holding of the object O by the holder 100 temporarily and re-hold the object O using the holder 100.

Next, the movement plan modifier 546 will be described. In a case where the score S calculated by the holding state determiner 545 is less than the first threshold K1 and is the second threshold K2 or more, the movement plan modifier 546 modifies the movement plan of the object O. The movement plan modifier 546, for example, modifies the movement plan based on the value relating to the holding force detected by the holding force detecting sensor 402 and the parameters relating to the object O estimated by the parameter estimator 544 or the parameters acquired from the object DB 561. In addition, first to third modification examples of the movement plan represented below may be combined and performed together.

Figure 8:
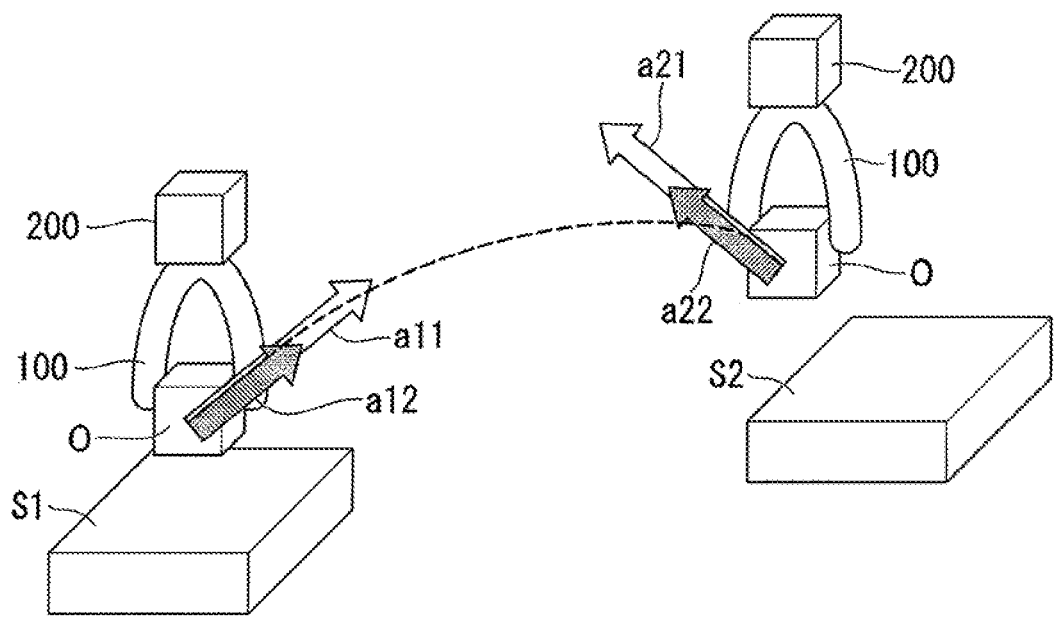
FIG. 8 is a perspective view showing a first modification example of the movement plan according to the first embodiment.

First, the first modification example of the movement plan will be described. FIG. 8 is a diagram showing the first modification example of the movement plan. The movement plan modifier 546, for example, modifies the movement plan such that the movement path (track) of the object O is not changed, and the maximum acceleration acting on the object O is decreased. For example, in a case where high maximum accelerations a11 and a21 act on the object O in an initial stage and a final stage of movement, respectively, in a movement plan before modification, the movement plan modifier 546 modifies the movement plan such that the maximum accelerations acting on the object O are decreased in the initial stage and the final stage of the movement (accelerations a12 and a22 lower than the maximum accelerations a11 and a21, respectively, act as maximum accelerations). In redetermination (redetermination based on the modified movement plan) using the holding state determiner 545, the movement plan modifier 546 modifies the movement plan such that the score S becomes the first threshold K1 or more.

Figure 9:
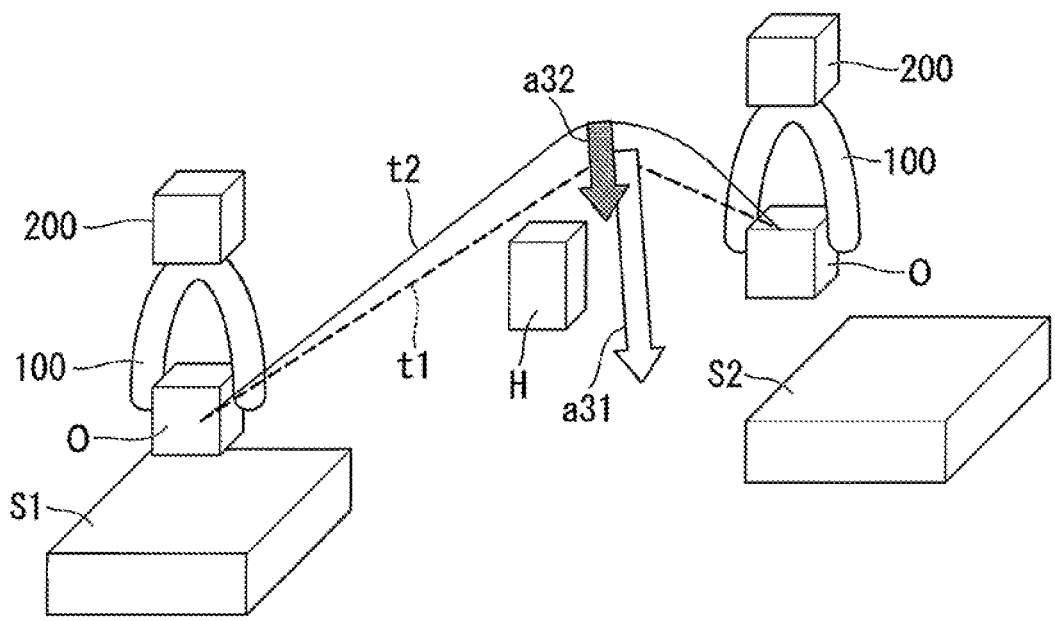
FIG. 9 is a perspective view showing a second modification example of the movement plan according to the first embodiment.

Next, the second modification example of the movement plan will be described. FIG. 9 is a diagram showing the second modification example of the movement plan. For example, by changing the movement path (track) of the object O, the movement plan modifier 546 modifies the movement plan such that the maximum acceleration acting on the object O is decreased. Here, a track t1 included in the movement plan before modification may include a part in which the track is abruptly bent in the vicinity of an obstacle H for shortening the movement path of the object O while avoiding the obstacle H. In such a case, in the part in which the track t1 is abruptly bent, a high acceleration (a maximum acceleration a31) acts on the object O. In such a case, the movement plan modifier 546 modifies the movement plan such that the object O is moved along a track t2 in which an abrupt direction change is suppressed by gently moving the object O by making a slight detour around an obstacle H, and the maximum acceleration acting on the object O is decreased (an acceleration a32 lower than the maximum acceleration a31 acts as a maximum acceleration). In redetermination (redetermination based on a modified movement plan) using the holding state determiner 545, the movement plan modifier 546 modifies the movement plan such that the score S is the first threshold K1 or more.

Figure 10A:
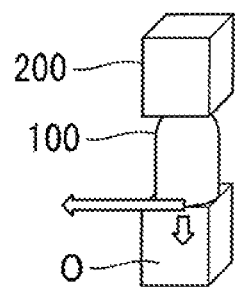
FIG. 10A is a perspective view showing a characteristic of a coefficient α relating to a posture of a holder according to the first embodiment.

Next, the third modification example of a movement plan will be described. FIG. 10A is a diagram showing a characteristic of a coefficient α relating to the posture of the holder 100 with respect to the direction of the resultant force F. A length of an arrow illustrated in FIG. 10A represents the magnitude of the coefficient α of a case in which the resultant force F acts in the direction of the arrow. As described above, the coefficient α is a minimum in a case where a specific direction set in accordance with a positional relation between the holder 100 and the object O (for example, a direction in which the sucker 101 and the object O are aligned) and a direction in which the resultant force F acts coincide with each other, increases as an angle between the specific direction and the direction in which the resultant force F acts increases, and is a maximum in a case where the specific direction and the direction in which the resultant force F acts are substantially orthogonal to each other.

Figure 10B:
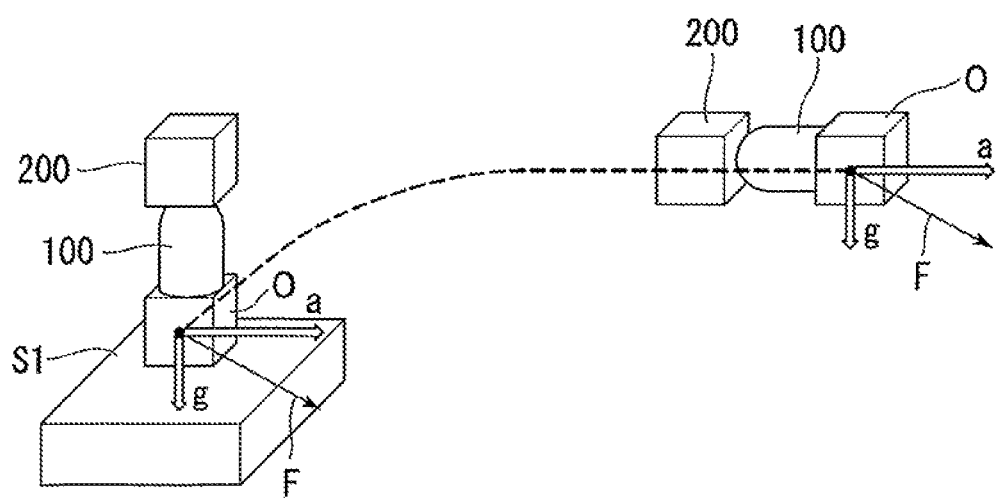
FIG. 10B is a perspective view showing a third modification example of the movement plan according to the first embodiment.

FIG. 10B is a diagram showing the third modification example of a movement plan. The movement plan modifier 546, for example, modifies the movement plan of the object O such that the posture of the holder 100 is changed during movement of the object O toward the movement destination S2. For example, the movement plan modifier 546 changes the posture of the holder 100 during the movement such that the direction in which the resultant force F acts is close to a direction in which the coefficient α decreases the most. The movement plan modifier 546 modifies the movement plan such that the score S becomes the first threshold K1 or more in redetermination using the holding state determiner 545 (redetermination based on the modified movement plan).

Next, the hold retry operation generator 547 will be described. In a case where the score S calculated by the holding state determiner 545 is less than the second threshold K2, the hold retry operation generator 547 generates an operation plan for retrying (re-performing) a holding operation of the object O. In other words, the hold retry operation generator 547 generates an operation plan in which the object O is released at the movement source S1 temporarily, and the object O is re-held by the holder 100. For example, the hold retry operation generator 547 generates a hold retry operation plan in which at least one of a holding position on the surface of the object O at which the holder 100 holds the object O and a holding posture of the holder 100 with respect to the object O is changed. The hold retry operation generator 547 outputs the generated hold retry operation plan to the operation controller 550.

Next, the operation controller 550 will be described. The operation controller 550 controls the holder 100 and the moving mechanism 200 based on the operation plan planned by the planner 540. For example, the operation controller 550 holds an object O positioned at the movement source S by controlling the holder 100 and the moving mechanism 200 based on a holding operation plan generated by the holding operation generator 541. The operation controller 550 executes a test operation of moving the object O using the holder 100 by controlling the moving mechanism 200 based on an operation plan of the test operation generated by the test operation generator 543. In a case where the score S calculated by the holding state determiner 545 is the first threshold K1 or more, the operation controller 550 moves the object O using the holder 100 based on a movement plan (a movement plan of an initial period; a movement plan without any modification) of the object O generated by the movement plan generator 542. On the other hand, in a case where the score S calculated by the holding state determiner 545 is less than the first threshold K1 and is the second threshold K2 or more, the operation controller 550 moves the object O using the holder 100 based on a movement plan of the object O modified by the movement plan modifier 546. In addition, in a case where the score S calculated by the holding state determiner 545 is less than the second threshold K2, the operation controller 550 re-holds the object O using the holder 100 based on a hold retry operation plan of the object O generated by the hold retry operation generator 547.

Figure 11:
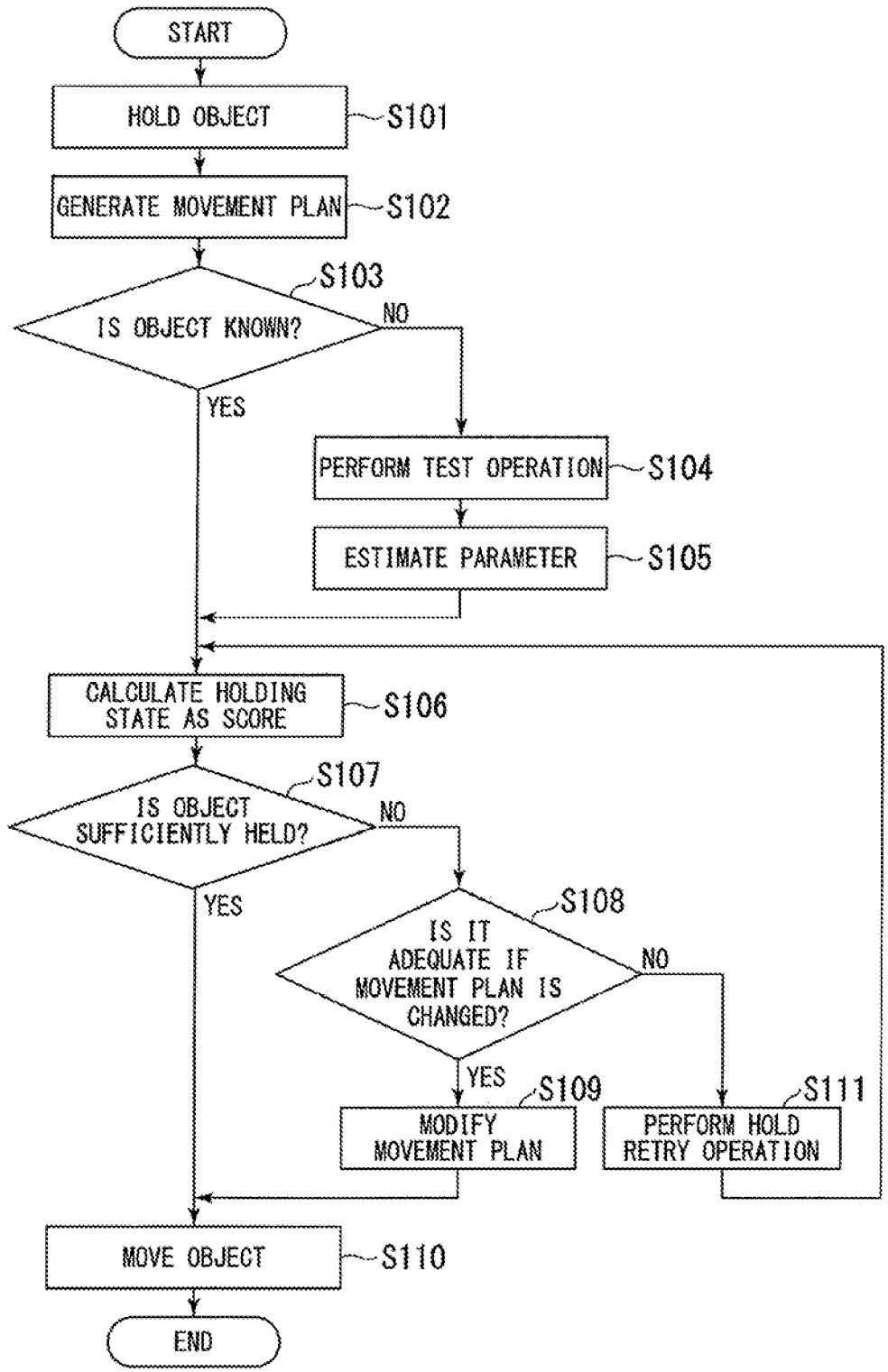
FIG. 11 is a flowchart showing one example of a flow of a process of a control device according to the first embodiment.

Next, one example of the flow of the process of the control device 500 will be described. FIG. 11 is a flowchart showing one example of the flow of the process of the control device 500. First, the holding operation generator 541 generates a holding operation plan for the object O. The operation controller 550 holds the object O positioned at the movement source S1 by controlling the holder 100 and the moving mechanism 200 based on the holding operation plan generated by the holding operation generator 541 (S101). In addition, the movement plan generator 542 generates a movement plan of the object O (S102).

Next, the object determiner 530, for example, determines whether or not the object O held by the holder 100 is a known object based on image data captured by the object detecting camera 300 (S103). Here, the process of S103 may be performed substantially simultaneously with the process of S101 or S102 or may be performed before the process of at least one of S101 and S102.

In a case where the object O is determined as being a known object, the control device 500 proceeds to determination of a holding state (Step S106) to be described later without performing a test operation. On the other hand, in a case where the object O is determined as not being a known object, the test operation generator 543 generates an operation plan of a test operation. The operation controller 550 performs a test operation in a state in which the object O is held by the holder 100 based on the operation plan of the test operation generated by the test operation generator 543 (S104). At this time, the force sensor 401 measures a force and a moment acting on the force sensor 401 before the test operation and measures a force and a moment acting on the force sensor 401 during the test operation.

In a case where the test operation is performed, the parameter estimator 544 estimates a weight and a three-dimensional position of the center of gravity as parameters relating to the object O based on the information measured by the force sensor 401 (S105). Here, the weight and the three-dimensional position of the center of gravity estimated by the parameter estimator 544 may be registered in the object DB 561 in association with the feature information of the object O. In such a case, in a case where the same object O is to be held next time, the test operation and the process of estimating the parameters may be omitted.

Next, the holding state determiner 545 determines a holding state of the holder 100 for the object O. Here, in a case where the object O is determined as being a known object in the process of S103, parameters relating to the object O are acquired from the object DB 561. On the other hand, in a case where the object O is determined as being an unknown object in the process of S103, the parameters estimated by the parameter estimator 544 are used as parameters relating to the object O.

The holding state determiner 545 calculates the holding state as a score S, for example, based on Equation (1) or (2) described above (S106). Then, the holding state determiner 545, first, determines whether or not the object O is held sufficiently by the holder 100, in other words, whether or not the object O can be transported without dropping the object O even in the movement plan (for example, a movement plan for moving the object O in a shortest time using the transporter 11) generated by the movement plan generator 542 (S107). The process of S107, for example, is performed by comparing the score S calculated by the holding state determiner 545 with the first threshold K1. In a case where the score S is the first threshold K1 or more, the holding state determiner 545 determines that the object O is held sufficiently by the holder 100, and the object O can be transported without dropping the object O even in the movement plan generated by the movement plan generator 542. In such a case, the operation controller 550 moves the object O based on the movement plan generated by the movement plan generator 542 (S110).

In a case where the score S is less than the first threshold K1 in the process of S107, the holding state determiner 545 determines that the holding of the object O using the holder 100 is not sufficient and there is a possibility of dropping the object O in the movement plan generated by the movement plan generator 542. In such a case, the holding state determiner 545 determines whether or not the object O can be transported without dropping the object O in a case where the movement plan of the object O is modified (S108). The process of this S108, for example, is performed by comparing the score S calculated by the holding state determiner 545 with the second threshold K2.

In a case where the score S is the second threshold K2 or more in the process of S108, the holding state determiner 545 determines that the object O can be transported without being dropped in a case where the movement plan is modified. In such a case, the movement plan is modified by the movement plan modifier 546 (S109). Then, the operation controller 550 moves the object O based on the movement plan modified by the movement plan modifier 546 (S110).

On the other hand, in a case where the score S is less than the second threshold K2 in the process of S108, the holding state determiner 545 determines that there is a possibility of dropping the object O even in a case where the movement plan is modified. In such a case, the hold retry operation generator 547 generates a hold retry operation plan. Then, operation controller 550 re-holds the object O based on the hold retry operation plan generated by the hold retry operation generator 547 (S111). In this case, the process of S106 and subsequent steps is performed.

According to such a configuration, the object O can be conveyed more efficiently. In other words, in a picking operation of an object O using a transporter, in order to perform the operation quickly and accurately, it is preferable to move the object in a shortest path in which the object O can be moved in a shortest time without being dropped in accordance with the features of the object O and the holding state of the holder 100. For this reason, in order to move the holder 100 at a high speed and a high acceleration, it is necessary to check whether or not the holding state of the holder 100 is a holding state corresponding thereto. However, in a case where parameters relating to the object O are not clear, there are cases in which it is difficult to perform the checking described above. For this reason, in a case where the parameters relating to the object O are not clear (for example, a case in which the three-dimensional position of the center of gravity is not clear), a movement plan in which a movement speed and an acceleration of the holder 100 are suppressed such that the object O is not dropped is generated. In this case, there may be a case in which the object O cannot be efficiently transported.

On the other hand, in this embodiment, the transporter 11 includes the operation controller 550 that performs a test operation of moving the holder 100 in a state in which the object O is held by the holder 100 and the parameter estimator 544 that estimates at least one parameter relating to the object O based on a result of detection acquired by the force sensor 401 during the test operation. According to such a configuration, even in a case where the object O is unknown (a case in which parameters relating to the object O are not clear), the parameter relating to the object O is estimated through a test operation, and the holding state of the object O can be checked based on the estimated parameter. Accordingly, after a holding state corresponding to a movement plan of a high speed and a high acceleration is checked, the object O can be moved in accordance with the movement plan of a high speed and a high acceleration. In this way, the object O can be transported more efficiently.

In this embodiment, the test operation is performed before a conveyance operation of moving the object O toward the movement destination S2. According to such a configuration, by performing a test-dedicated operation before actually moving an object O, parameters relating to the object O can be estimated with high accuracy.

In this embodiment, the parameter estimator 544 does not estimate parameters relating to an object O in a case where the object O is determined as being an object of which the parameters are stored in the storage 560 and estimates the parameters relating to the object O in a case where the object O is determined as not being an object of which parameters are stored in the storage 560. According to such a configuration, in a case where the parameters of an object O are known, a test operation and the process of estimating parameters can be omitted, and accordingly, more efficient conveyance can be realized.

In this embodiment, one of the parameters is the position of the center of gravity of the object O. According to such a configuration, the holding state of the object O can be determined also in consideration of a moment based on the position of the center of gravity of the object O. In this way, the holding state of the object O can be determined with a higher accuracy.

In this embodiment, the test operation includes an operation of inclining the holder 100 holding the object O. According to such a configuration, the three-dimensional position of the center of gravity of the object O can be calculated through a simple operation. For example, this test operation is performed at a position to which the holder 100 has lifted the object O from the movement source S1 without moving the holder 100 toward the movement destination S2. According to such a configuration, in a case where the holding state of the holder 100 is unstable, the object O can be placed back immediately at the movement source S1, and the object O can be re-held by the holder 100. Accordingly, the object O can be conveyed more efficiently.

The test operation includes an operation of applying an acceleration to the holder 100 holding the object O without inclining the holder 100. According to such a configuration, for example, in a case where an object O is a heavy load, the test operation can be performed without inclining the object O. In addition, even in a case where the value of the coefficient α described above greatly changes in accordance with the posture of the holder, the test operation can be performed in a state in which the value of the coefficient α is large (a state in which it is more difficult to drop the object O).

In this embodiment, the test operation includes an operation of applying an acceleration to the object O by moving the holder 100 in a direction different from a direction toward the movement destination of the object O. According to such a configuration, the test operation can be performed using a safer direction, an area having a more spatial margin, or the like, and the degree of freedom of the test operation can be increased.

In this embodiment, in a case where the first acceleration that is a maximum acceleration in the first direction will act on the object O at the first time point, and the second acceleration that is a maximum acceleration in the second direction will act on the object O at the second time point in the movement plan of the object O toward the movement destination S2, the test operation includes an operation of applying the first acceleration to the object O in the first direction and applying the second acceleration to the object O in the second direction. According to such a configuration, the test operation can be performed in compliance with an actual movement plan. In this way, the holding state of the object O can be determined with a higher accuracy.

In this embodiment, the holding state determiner 545 determines a holding state of the object O using the holder 100 based on a value relating to a holding force detected by the holding force detecting sensor 402, parameters relating to the object O estimated by the parameter estimator 544, and the movement plan of the object O toward the movement destination S2 of the object O. According to such a configuration, the holding state can be determined with a high accuracy in consideration of a moment acting on the object O and the like based on details (for example, a maximum acceleration acting on the object O) of the movement plan and the parameters relating to the object O.

Here, one example of a method of determining the first threshold K1 and the second threshold K2 will be described. The first threshold K1 and the second threshold K2, for example, can be determined while the transporter 11 is operated through trial and error. For example, regarding the first threshold K1, a test operation is executed at a maximum acceleration that can be generated by the moving mechanism 200, and, in a case where an object O is not dropped, a score S (S1) at that time is set as the first threshold K1. Then, for an object O held next, similarly, a test operation is executed at the maximum acceleration that can be generated by the moving mechanism 200, and, in a case where the object O is not dropped, and a score S (S2) at that time is lower than the first threshold K1, the value of the first threshold K1 is updated with the value of the score S (S2). By repeating this operation, the first threshold K1 can be determined. Accordingly, the value of the first threshold K1 can be set to be small as possibly as can in a range in which the object O is not dropped. As a result, the number of times of moving the object O can be increased in the movement plan of a high speed and a high acceleration without modifying the movement plan. In this way, the object O can be efficiently conveyed.

Regarding the second threshold K2, a test operation is executed at the minimum acceleration that is allowed in time, and, in a case where the object O is not dropped, a score S (S3) at that time is set as the second threshold K2. Then, for an object O held next, similarly, a test operation is executed at the minimum acceleration that is allowed in time, and, in a case where the object O is not dropped, and a score S (S4) at that time is lower than the second threshold K2, the value of the second threshold K2 is updated with the value of the score S (S4). By repeating this operation, the second threshold K2 can be determined. Accordingly, the value of the second threshold K2 can be set to be small as possibly as can in a range in which the object O is not dropped. As a result, the number of times of moving the object O can be increased by only modifying the movement plan without re-holding the object O. In this way, the object O can be efficiently conveyed.

Second Embodiment

Next, a second embodiment will be described with reference to FIGS. 12 to 14. The second embodiment is different from the first embodiment in that a behavior monitor 403 monitoring a behavior of an object O is disposed. The other components other than those described below are similar to those according to the first embodiment.

Figure 12:
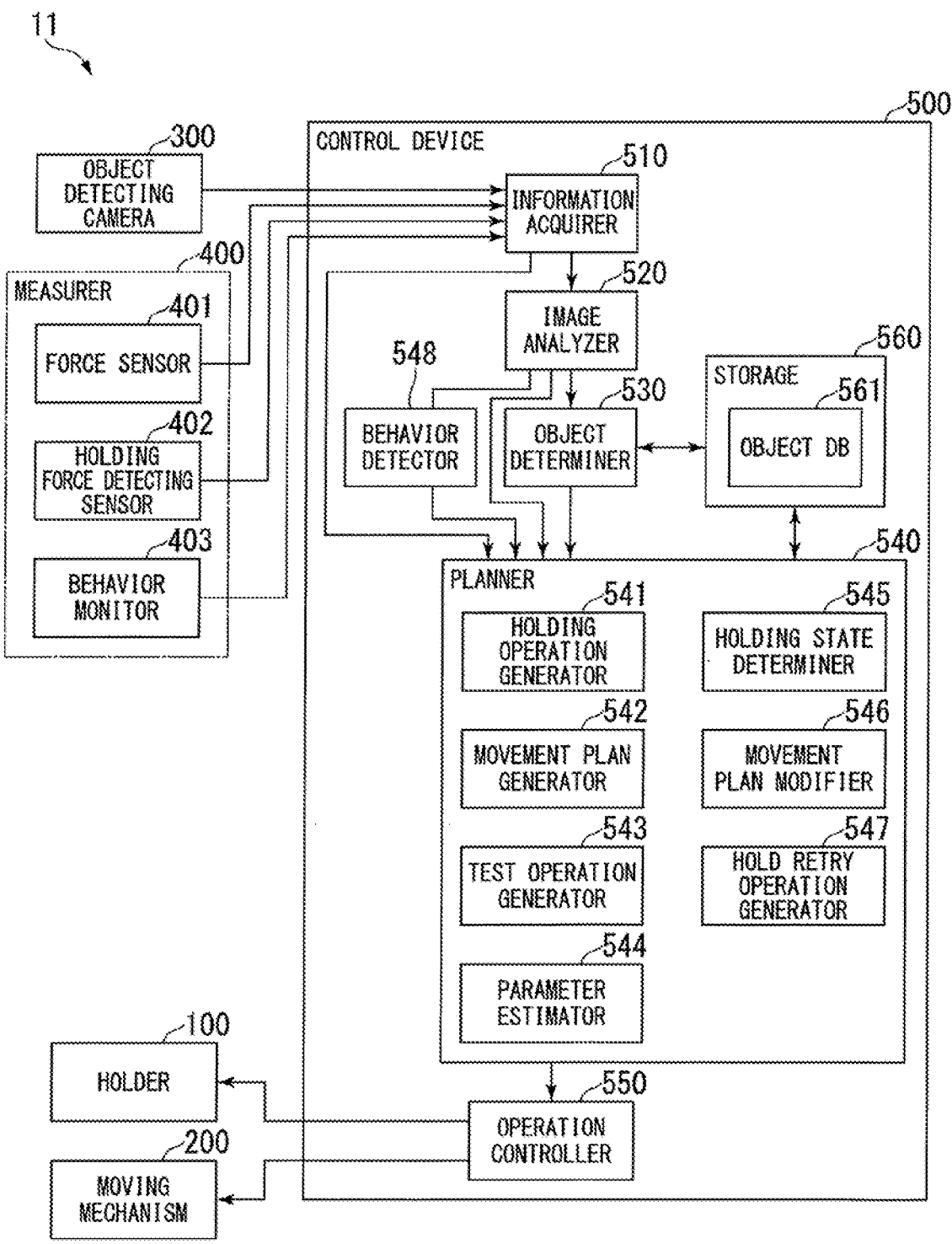
FIG. 12 is a block diagram showing a system configuration of a transporter according to a second embodiment.

FIG. 12 is a block diagram showing a system configuration of a transporter 11 according to the second embodiment. As shown in FIG. 12, in this embodiment, a measurer 400 includes the behavior monitor 403. The behavior monitor 403 is provided at a holder 100 or a moving mechanism 200 and monitors a behavior of an object O during a test operation. Here, "a behavior of an object O" represents a relative movement of the object O with respect to the holder 100 and represents a vibration (shake) of the object O with respect to the holder 100, a positional deviation of the object O with respect to the holder 100, or the like.

The behavior monitor 403, for example, is a camera that images an object O or a distance sensor that measures a distance between the object O and the behavior monitor 403. A result of detection acquired by the behavior monitor 403 is output to a control device 500. In addition, in a case where the behavior of the object O can be imaged during a test operation using an object detecting camera 300, the object detecting camera 300 may function as one example of the behavior monitor 403.

Figure 13:
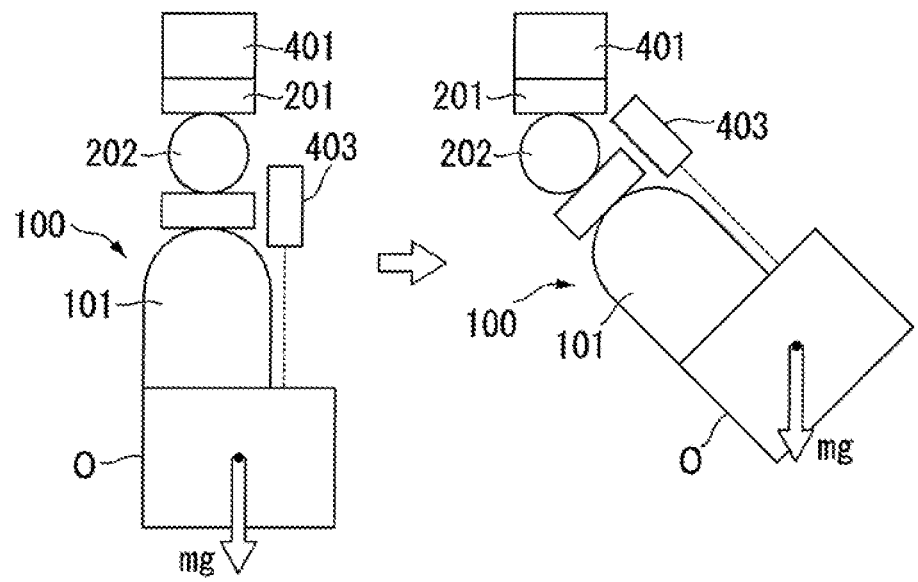
FIG. 13 is a front view showing a first example of a test operation of the transporter according to the second embodiment.

FIG. 13 is a diagram showing a first example of a test operation according to this embodiment. The behavior monitor 403 monitors a behavior of the object O in a case where the object O is inclined. For example, the behavior monitor 403 is disposed integrally with a part of the holder 100 or the moving mechanism 200 and is inclined together with the holder 100 in a case where the holder 100 is inclined. Accordingly, in a case where a behavior of the object O is not generated, a distance between the behavior monitor 403 and the object O is maintained as being constant. Accordingly, in a case where a behavior of the object O is generated, the behavior monitor 403 can perceive the behavior with a high accuracy.

Figure 14:
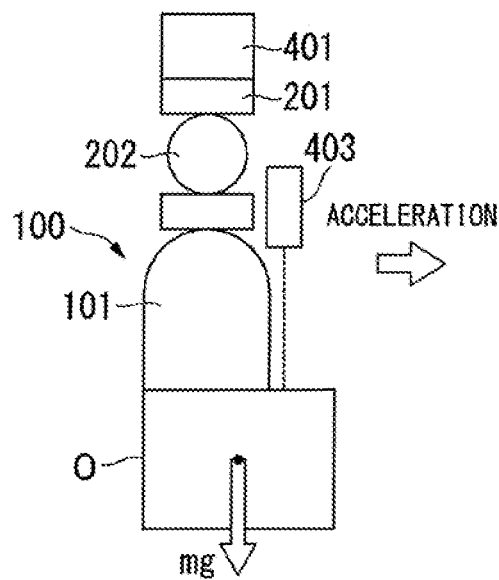
FIG. 14 is a front view showing a second example of the test operation of the transporter according to the second embodiment.

FIG. 14 is a diagram showing a second example of a test operation according to this embodiment. The behavior monitor 403 monitors a behavior of the object O in a case where a translational acceleration is applied to the object O. For example, the behavior monitor 403 is disposed integrally with a part of the holder 100 or the moving mechanism 200 and is moved together with the holder 100 in a case where the holder 100 moves. Accordingly, in a case where a behavior is not generated in the object O, a distance between the behavior monitor 403 and the object O is maintained as being constant. Accordingly, in a case where a behavior of the object O is generated, the behavior monitor 403 can perceive the behavior with a high accuracy.

In addition, a holding force detecting sensor 402 can detect whether a holding force of the holder 100 for the object O decreases during a test operation in the first example and the second example of the test operation described above. For example, in the case of the holder 100 including a sucker 101, the holding force detecting sensor 402 that is a pressure sensor can detect whether the holding force of the holder 100 for the object O decreases by detecting the pressure of the inside of the sucker 101 during the test operation. On the other hand, in the case of the holder 100 including a pinching member 102, the holding force detecting sensor 402 that is a pressure sensitive sensor can detect whether the holding force of the holder 100 for the object O decreases by detecting a contact pressure between the pinching member 102 and the object O during the test operation.

Next, referring back to FIG. 12, the description will be continued. In this embodiment, the control device 500 includes a behavior detector 548 that detects the behavior of the object O based on a result of monitoring executed by the behavior monitor 403. The behavior detector 548, for example, detects a behavior of the object O based on an image analysis of an image analyzer 520 for image data acquired by the behavior monitor 403 that is a camera. In addition, the behavior detector 548, for example, detects a behavior of the object O based on information acquired by the behavior monitor 403 that is a distance sensor.

In this embodiment, a holding state determiner 545 determines a holding state of the object O using the holder 100 also based on the behavior of the object O during the test operation in addition to the value relating to the holding force detected by the holding force detecting sensor 402, parameters relating to the object O, and the movement plan of the object O toward the movement destination S2 of the object O. In other words, the holding state determiner 545 compares the magnitude of the behavior of the object O during the test operation with a threshold and determines that the holding state for the object O is weak in a case where the magnitude of the behavior of the object O is larger than the threshold. For example, in a case where the magnitude of the behavior of the object O is larger than the threshold, the holding state determiner 545 modifies the score S described above such that the score S is decreased.

In addition, in a case where a decrease in the holding force of the holder 100 for the object O is determined during the test operation, the holding state determiner 545 reflects a result thereof on the holding state of the object O using the holder 100. For example, in a case where a decrease in the holding force during a test operation is larger than the threshold, the holding state determiner 545 modifies the score S described above such that the score S is decreased.

According to such a configuration, in addition to the actions according to the first embodiment described above, the holding state of the object O can be determined with a higher accuracy.

Modified Example of Second Embodiment

Next, a modified example of the second embodiment will be described with reference to FIG. 15. In this modified example, a frictional coefficient between the holder 100 and the object O is estimated as one of parameters relating to the object O, which is different from the second embodiment. Components other than those described below are similar to those according to the second embodiment.

Figure 15:
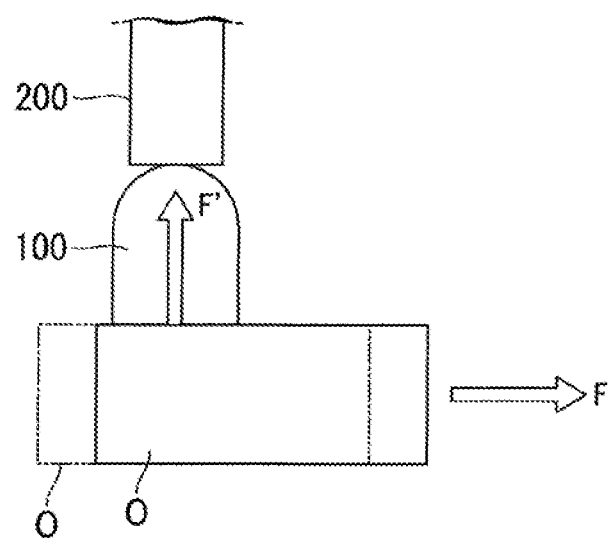
FIG. 15 is a front view showing a holder according to a modification example of the second embodiment.

FIG. 15 is a front view showing the holder 100 according to this modified example. As illustrated in FIG. 15, in a test operation, in a case where a force F acts in a direction that is substantially orthogonal to a direction in which the holder 100 and the object O are aligned in a state in which the holder 100 holds the object O with a holding force F', the object O is assumed to deviate from the holder 100. In this case, in a case where a frictional coefficient between the holder 100 and the object O is denoted by $\mu$, the following Equation (3) is satisfied.

$$F = \mu F' \qquad (3)$$

In other words, in a case where the object O deviates from the holder 100, the parameter estimator 544 estimates a frictional coefficient between the holder 100 and the object O based on the force F applied to the object O and the holding force F'.

In this embodiment, the holding state determiner 545 determines the holding state of the object O also based on the frictional coefficient between the holder 100 and the object O. In other words, the holding state determiner 545 may set or modify the value of the coefficient $\beta_2$ in Equation (2) described above or modify the value of the coefficient $\alpha$ in Equation (1) or (2) described above based on the frictional coefficient between the holder 100 and the object O that is estimated by the parameter estimator 544. According to such a configuration, the holding state of the object O can be determined with a higher accuracy.

Third Embodiment

Next, a third embodiment will be described with reference to FIG. 16. In the third embodiment, several functional units provided at the control device 500 in the first embodiment are provided at a management device 12, which is different from the first embodiment. Components other than those described below are similar to those according to the first embodiment.

Figure 16:
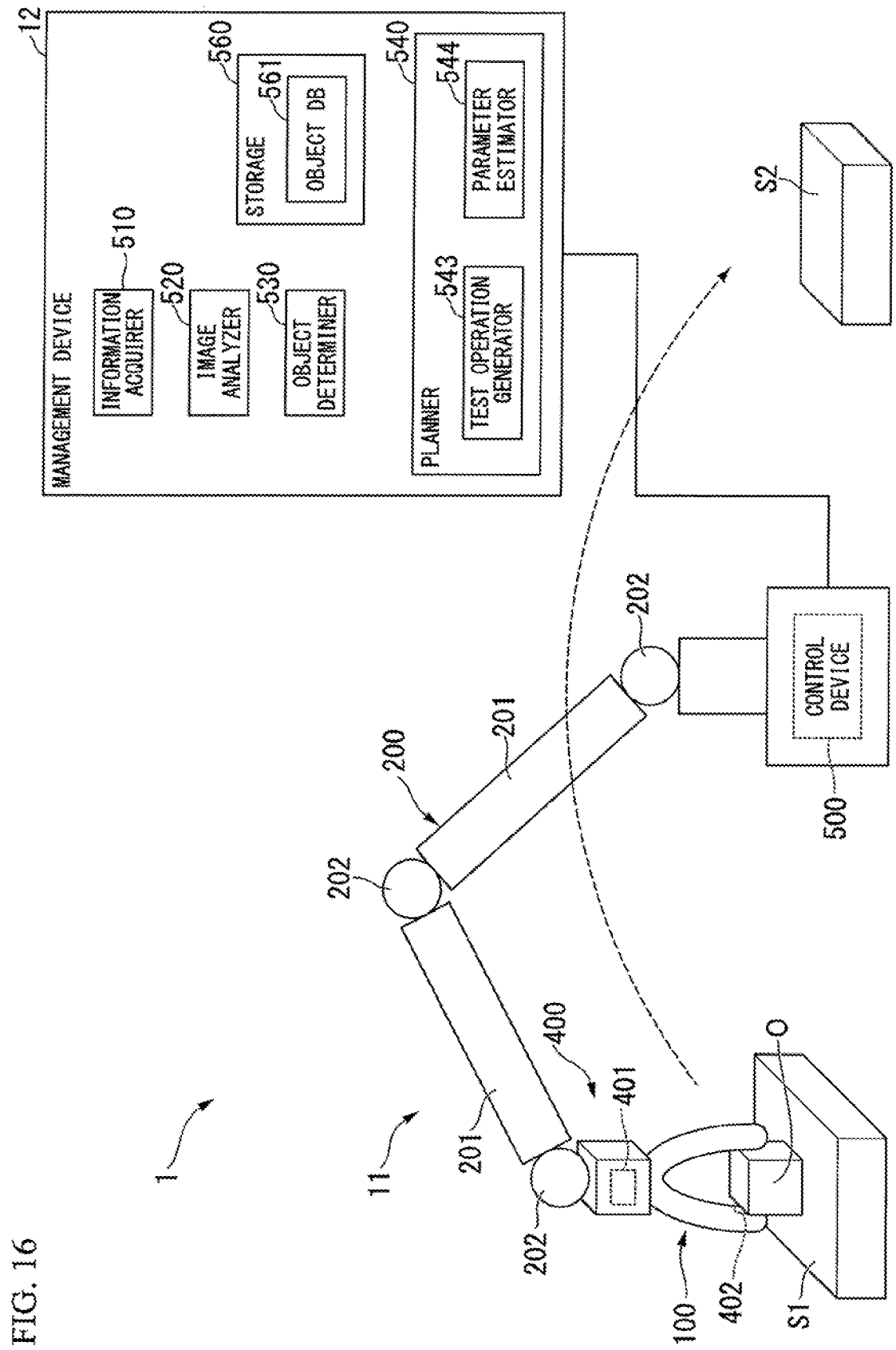
FIG. 16 is a diagram schematically showing a transport system according to a third embodiment.

FIG. 16 is a diagram schematically showing a transport system 1 according to this embodiment. As shown in FIG. 16, in this embodiment, at least the information acquirer 510, the image analyzer 520, the object determiner 530, the storage 560, the test operation generator 543, and the parameter estimator 544 are provided in the management device 12. The test operation generator 543 outputs a control direction relating to a test operation to the control device 500 of the transporter 11.

According to such a configuration, similar to the first embodiment described above, the object O can be moved more efficiently.

As above, the first to third embodiments and modified examples thereof have been described. However, the embodiments are not limited to the examples described above. The first to third embodiments may be combined and executed.

For example, the information acquirer 510 may acquire information that can be used for identifying an object O not from the object detecting camera 300 but from the management device 12 or any other external apparatus through a network. For example, the information acquirer 510 may acquire information acquired from an external apparatus in a case where the object O is collected or loaded as the information that can be used for identifying the object O. In such a case, the object detecting camera 300 may be omitted.

For example, a contact-type switch may be provided in the holder 100 (for example, the sucker 101 or the pinching member 102). The contact-type switch transitions from an off-state to an on-state by being brought into contact with the object O in a case where the object O is held in the holder 100. In a case where a predetermined condition is satisfied (for example, in a case where the object O is known), the holding state determiner 545 may determine the holding state for the object O based on the on/off state of a switch provided in the holder 100 instead of calculating the score S. Accordingly, in a case where the predetermined condition is satisfied, the object O can be moved based on determination of the holding state, which is simpler.

According to at least one of the embodiments described above, by including the operation controller configured to execute a test operation of moving an object using the holder and the parameter estimator configured to estimate at least one parameter relating to the object based on a result of detection acquired by a sensor during the test operation, the object can be moved more efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transporter comprising:
    a holder configured to hold an object;
    a moving mechanism configured to move the holder;
    a sensor provided at the holder or the moving mechanism, the sensor being configured to measure a force and a moment which act on the holder;
    an operation controller configured to execute a test operation including an operation of inclining the holder holding the object in a state in which the object is held by the holder before an operation of moving the object toward a movement destination of the object;
    a parameter estimator configured to estimate a position in a horizontal direction of a center of gravity of the object and a position in a vertical direction of the center of gravity of the object as parameters relating to the object based on the force measured by the sensor during the test operation, the moment measured by the sensor before inclining the holder during the test operation, and the moment measured by the sensor after having inclined the holder during the test operation; and
    a first determiner configured to determine a content of the operation of moving the object toward the movement destination of the object based on the position in the horizontal direction of the center of gravity of the object and the position in the vertical direction of the center of gravity of the object.

2. The transporter according to claim 1, further comprising
    a storage,
    wherein the parameter estimator dose not estimate the parameters relating to the object in a case where it is determined that the object is an object of which the parameters are stored in the storage, and the parameter estimator estimates the parameters relating to the object in a case where it is determined that the object is not an object of which the parameters are stored in the storage.

3. The transporter according to claim 1, wherein
    the operation of inclining the holder in the test operation is an operation of inclining the holder without moving the holder holding the object toward the movement destination of the object.

4. The transporter according to claim 1, wherein
    the test operation includes an operation of applying an acceleration to the holder holding the object.

5. The transporter according to claim 1, wherein
    the test operation includes an operation of applying an acceleration to the holder holding the object by moving the holder in a direction different from a direction toward a movement destination of the object.

6. The transporter according to claim 1, wherein
    in a case where, in a movement plan of the object toward the movement destination of the object, a first acceleration which is a maximum acceleration in a first direction will act on the object at a first time point, and a second acceleration which is a maximum acceleration in a second direction will act on the object at a second time point, the test operation includes an operation of applying the first acceleration to the object in the first direction and applying the second acceleration to the object in the second direction.

7. The transporter according to claim 1, further comprising
    a test operation generator configured to generate a plan of the test operation,
    wherein the test operation generator changes a content of the test operation based on a weight of the object.

8. The transporter according to claim 1, further comprising:
    a detector configured to detect a value relating to a holding force of the holder for the object; and
    a second determiner configured to determine a holding state of the holder for the object based on the value relating to the holding force detected by the detector and the parameters relating to the object estimated by the parameter estimator.

9. The transporter according to claim 8, wherein
    the second determiner determines the holding state of the holder for the object based on a movement plan of the object toward the movement destination of the object in addition to the value relating to the holding force detected by the detector and the parameters relating to the object estimated by the parameter estimator.

10. The transporter according to claim 8, wherein
    the second determiner calculates the holding state of the holder for the object as a score, and
    the operation controller moves the object using the holder based on a movement plan of the object in a case where the score satisfies a first condition, the operation controller moves the object using the holder based on a modified movement plan of the object in a case where the score satisfies a second condition, and operation controller re-holds the object using the holder in a case where the score satisfies a third condition, the first condition, the second condition, and the third condition being defined by thresholds.

11. The transporter according to claim 10,
    wherein the first determiner is a movement plan modifier configured to modify the movement plan of the object,
    wherein the movement plan modifier modifies the movement plan to lower a maximum acceleration applied to the object in a case where the score satisfies the second condition.

12. The transporter according to claim 10,
    wherein the first determiner is a movement plan modifier configured to modify the movement plan of the object,
    wherein the movement plan modifier modifies the movement plan to change a movement path of the object toward the movement destination of the object in a case where the score satisfies the second condition.

13. The transporter according to claim 10,
    wherein the first determiner is a movement plan modifier configured to modify the movement plan of the object,
    wherein the movement plan modifier modifies the movement plan to change a posture of the holder during movement toward the movement destination of the object in a case where the score satisfies the second condition.

14. A transport system comprising:
a test operation generator configured to generate a control direction for a test operation including an operation of inclining a holder holding an object in a state in which the object is held by the holder before an operation of moving the object toward a movement destination of the object;
a parameter estimator configured to estimate a position in a horizontal direction of a center of gravity of the object and a position in a vertical direction of the center of gravity of the object as parameters relating to the object based on a force measured by a sensor during the test operation, a moment measured by the sensor before inclining the holder during the test operation, and the moment measured by the sensor after having inclined the holder during the test operation, the sensor being provided at the holder or a moving mechanism, the moving mechanism being configured to move the holder, the sensor being configured to measure the force and the moment which act on the holder; and
a determiner configured to determine a content of the operation of moving the object toward the movement destination of the object based on the position in the horizontal direction of the center of gravity of the object and the position in the vertical direction of the center of gravity of the object.

15. A controller comprising:
an operation controller configured to execute a test operation including an operation of inclining a holder holding an object in a state in which the object is held by the holder before an operation of moving the object toward a movement destination of the object;
a parameter estimator configured to estimate a position in a horizontal direction of a center of gravity of the object and a position in a vertical direction of the center of gravity of the object as parameters relating to the object based on a force measured by a sensor during the test operation, a moment measured by the sensor before inclining the holder during the test operation, and the moment measured by the sensor after having inclined the holder during the test operation, the sensor being provided at the holder or a moving mechanism, the moving mechanism being configured to move the holder the sensor being configured to measure the force and the moment which act on the holder; and
a determiner configured to determine a content of the operation of moving the object toward the movement destination of the object based on the position in the horizontal direction of the center of gravity of the object and the position in the vertical direction of the center of gravity of the object.

* * * * *